United States Patent [19]
Schulz

[11] 3,917,308
[45] Nov. 4, 1975

[54] ARRANGEMENT FOR SETTING THE CHAMBER OF A PAIR OF VEHICLE WHEELS

[75] Inventor: Waldemar Schulz, Dannenbuttel, Germany

[73] Assignee: Volkswagenwerk Aktiengesellschaft, Dannenbuttel, Germany

[22] Filed: Apr. 11, 1974

[21] Appl. No.: 460,030

[30] Foreign Application Priority Data
May 30, 1973 Germany............................ 2327609

[52] U.S. Cl. ............................... 280/124 B; 267/34
[51] Int. Cl.². .......................................... B60G 3/02
[58] Field of Search .................... 267/34; 280/124 B

[56] References Cited
UNITED STATES PATENTS

| | | | |
|---|---|---|---|
| 3,430,977 | 3/1969 | Riehl............................... | 280/124 A |
| 3,437,348 | 4/1969 | Henry-Biabaud............... | 280/124 A |
| 3,672,698 | 6/1972 | Froumejou...................... | 280/124 A |
| 3,810,651 | 5/1974 | Puchas........................... | 280/124 A |

*Primary Examiner*—James B. Marbert
*Attorney, Agent, or Firm*—Ernest F. Marmorek

[57] ABSTRACT

An arrangement for setting the camber of a wheel of a vehicle supported on the vehicle frame by means of a link coupling means and a guiding shock absorber leg, including means for fixedly securing the shock absorber leg at an upper region thereof to the vehicle frame, and means for securing the lower region of such shock absorber leg to the wheel support means of the vehicle, the last mentioned means including a pair of bolts spaced with respect to each other, one of the bolts being an eccenter bolt.

13 Claims, 5 Drawing Figures

ARRANGEMENT FOR SETTING THE CHAMBER OF A PAIR OF VEHICLE WHEELS

FIELD OF THE INVENTION

The present invention relates to an arrangement for setting the camber of a wheel of a vehicle which is supported by means of a link rod means and a shock absorber leg means supporting the wheel on the vehicle frame, the arrangement including an eccentric element. The phrase camber setting means the setting of the wheels of a vehicle closer together at the bottom than at the top.

BACKGROUND OF THE INVENTION

Such setting arrangement is known for example from German Pat. No. 1,092,779 wherein the camber setting arrangement requires that the shock absorber leg is rigidly coupled with the wheel support. The setting of the camber is performed with the help of a special journal body which couples the guide with the wheel support, that is, with the shock absorber. The wheel support is fixedly connected with a bolt running vertically and on which the journal body is supported rotatably.

The coupling between the journal body and the guide is performed by means of a bolt which is provided with a pair of lugs flush with each other and an eccentric intermediate piece having a fine outer thread thereon. Both lugs are rotatably and elastically journaled in the journaling eyes of the guide. The eccentric intermediate piece can be fixedly secured in a threaded bore of the journal body. During rotation of the eccentric intermediate bolt piece the entire journal body will shift along with the wheel support which is coupled thereto due to the eccentricity of the intermediate bolt piece and in a direction transverse to the vehicle, whereupon the camber of the wheel becomes set.

SUMMARY OF THE INVENTION

It is an object of the present invention to provide an improved simple and reliable arrangement for setting the camber of the wheels in a vehicle which permits the setting of the camber with an extremely small change in the wheel track and which requires a very small place for its mounting.

The invention provides that in its upper region the shock absorber leg is fixedly coupled with the vehicle frame and in the lower region the shock absorber leg is coupled by means of a pair of bolts arranged above each other to the wheel support, wherein one of the bolts is in the form of an eccenter bolt.

According to the present invention for the securing of the shock absorber on the wheel support on the wheel support as well as on the shock absorber there is an extension provided having a pair of bores in it arranged above each other wherein one of the bores in one of the extensions is formed as a longitudinal slot having a longitudinal axis radially directed with respect to the axis of the shock absorber leg. Preferably the eccenter bolt is provided with an eccenter shaft and with an eccenter disc positively coupled and eccentricly arranged to the eccenter shaft and, wherein the eccenter shaft passes through the respective bores in the extensions and the eccenter disc is guided in guide cheeks running parallel to the axis of the shock absorber leg, such guide cheeks being provided on that extension having said longitudinal slot.

The setting arrangement according to the present invention is very simple in its structure and the pivoting path during the setting is extremely small so that the setting of the camber will be associated only with a very minute change in the wheel track. For this reason, the space required for the setting arrangement can be kept very small, therefore, the free movement of the tires within the tire house of the frame, the turning of the wheels and the radius of the turning of the vehicle will not be influenced.

BRIEF DESCRIPTION OF THE DRAWINGS

The present invention will become more readily apparent from the following description of the preferred embodiments thereof shown in the accompanying drawings, in which.

DESCRIPTION OF THE PREFERRED EMBODIMENTS

Figure 1:
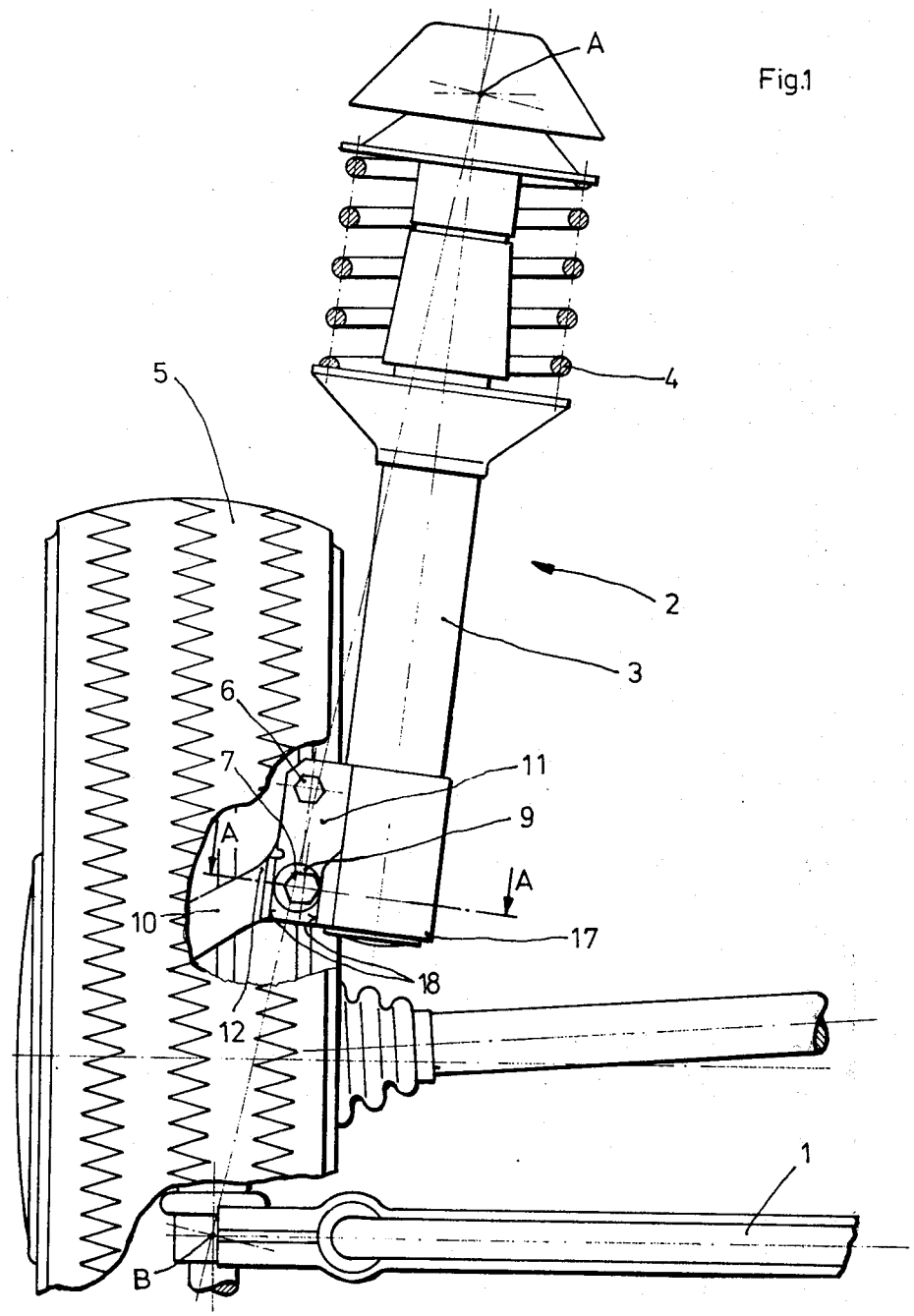
FIG. 1 is a schematic illustration, partly in section, of the suspension of the front wheel of the vehicle including an embodiment of the camber setting arrangement according to the present invention.

With reference to FIG. 1 it is seen that the front wheel 5 of a motor vehicle is coupled to the vehicle frame or vehicle upper structure, not illustrated in the drawing, by means of a shock absorber leg 2 and by means of a transversal link 1. The shock absorber leg 2 which consists substantially of a shock absorber 3 and a coil spring 4 is coupled with the upper structure of the vehicle at its upper regions. In its lower portion or region the shock absorber leg 2 is coupled with the wheel support 10 and more particularly with the tiltable bearing. Such coupling is effected by means of a pair of bolts 6 and 7 which are placed in the structure above each other and which protrude through appropriate bores each made in an extension 11 of the shock absorber leg 2 and an extension 12 of the wheel support 10. The extension 11 of the shock absorber leg 2 is formed in the illustrated embodiment by means of the shank of a clamp 17 which is wrapped around the shock absorber 3 of the leg 2 and which securely clamps the shock absorber 3.

Figure 2:
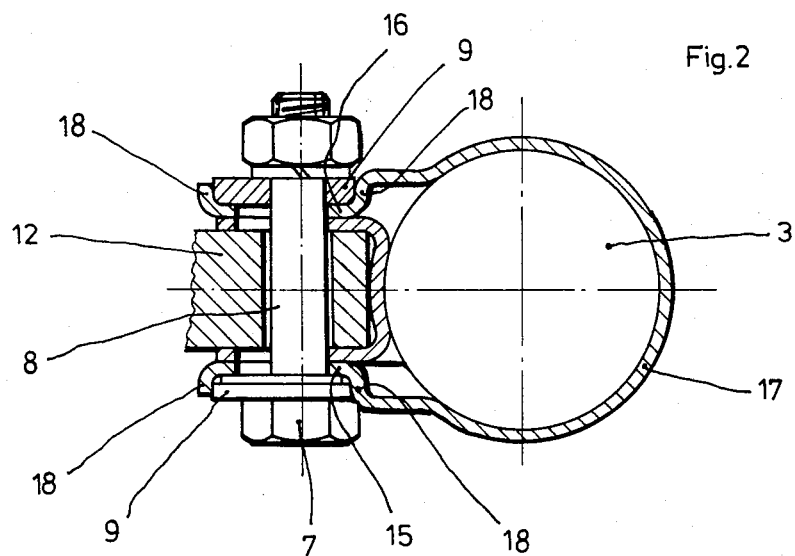
FIG. 2 is a fragmentary sectional view, taken on line A—A of FIG. 1 and showing a portion of the wheel suspension of FIG. 1 and of the setting arrangement.

With reference to FIG. 2 which is a cross sectional representation made through the wheel support and shock absorber coupling, it can be seen that the shank portion of the clamp 17 is formed from a pair of clamping jaws 15 and 16 running parallel to the axis of the shock absorber leg 2 and which are arranged next to each other and between the clamping jaws the extension 12 of the wheel support 10 is shoved into. According to the present invention, it is also possible that the shank portion of the clamping means 17 with both clamping jaws lying against each other are screwed together with the extension 12 of the wheel support 10. For the purpose of setting the camber of the wheel 5 one of the bolts, and more particularly the lower bolt 7, is formed as an eccenter bolt. It is however, within the scope of the present invention that instead of the lower bolt the upper bolt 6 should be in the shape of an eccenter bolt.

In the arrangement illustrated in FIG. 1, the lower bore provided in the extension 11 of the shock absorber leg 2 is made in the form of a longitudinal slot while the bores in the extension 12 of the wheel support 10 and the upper bore in extension 11 are made as normal bores, that is, without having any substantial play with respect to the bolts 6 and 7.

In the cross-sectional showing of FIG. 2 the different making of the lower bore in extension 12 and in extension 11, that is, here in the clamping jaws 15 and 16, can be recognized. The bolt 7 formed as an eccenter bolt is provided with an eccenter pin 8 and with an eccenter disc 9 which is positively coupled with the pin 8 and which is eccentrically arranged with respect thereto. The eccentric pin or shaft 8 presses through the respective bores of both extensions 11 and 12. The eccentric disc 9 is guided in the guide cheeks 18 of the clamping jaws 15 and 16 provided with a longitudinal slot. These guide cheeks 18 run parallel with the axis of the shock absorber leg 2. It can be recognized from the FIGS. 1 and 2 that the shock absorber leg 2 and the wheel support 10 will be shifted with respect to each other when the eccentric disc 9 is rotated. By rotating the eccentric bolt 7, the wheel 5 becomes pivoted about the supporting or hinging point B of the coupling 1. The resulting wheel track change, due to the beneficial selection of the pivoting point, remains relatively small. This is recognized distinctly when one compares this minute wheel track change with wheel track change which would occur if the camber setting would be performed by a pivoting about the upper hinge point A of the shock absorber leg 2, which for example is done in the above-mentioned German Pat. No. 1,092,779. A change in the king pin angle will not occur during a change of the camber since both coupling points A and B remain unchanged.

Figure 3:
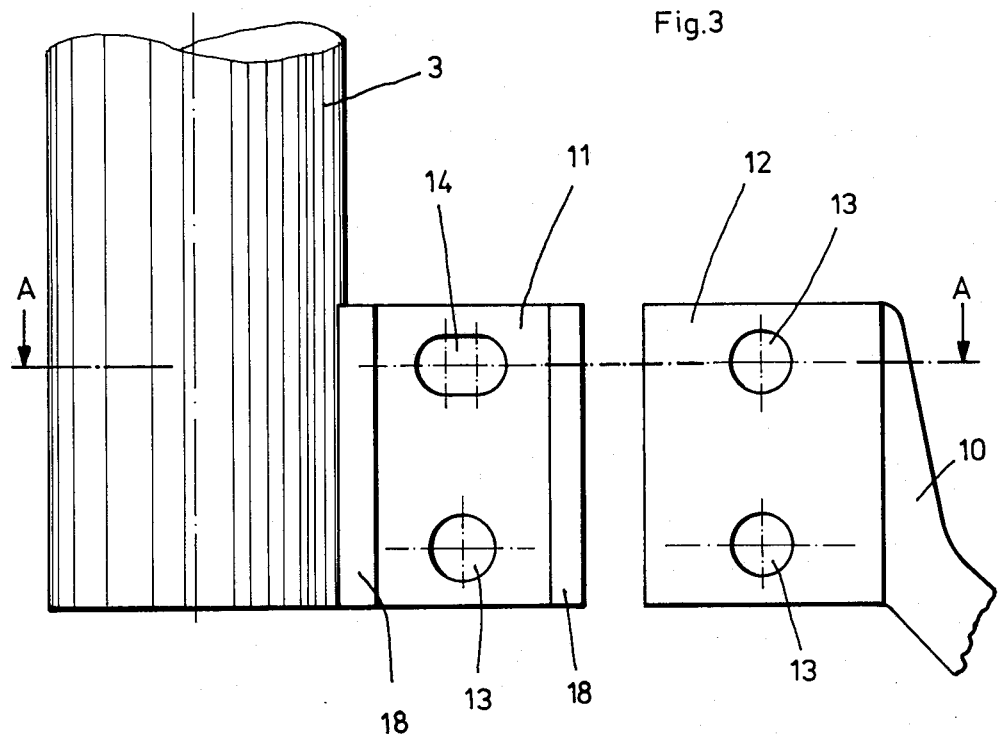
FIG. 3 is a schematic illustration of another embodiment of the setting arrangement similar to FIG. 1.

FIG. 3 illustrates a different embodiment according to the present invention for the setting of the camber. In contrary to the arrangement according to FIG. 1 the shock absorber 3 of the shock absorber leg 2 is here not clamped in a clamp. Furthermore, the shock absorber 3 is provided with an extension 11 having a pair of bores 13 and 14 arranged above each other. In this embodiment, the upper bore is formed as a longitudinal slot 14.

Figure 4:
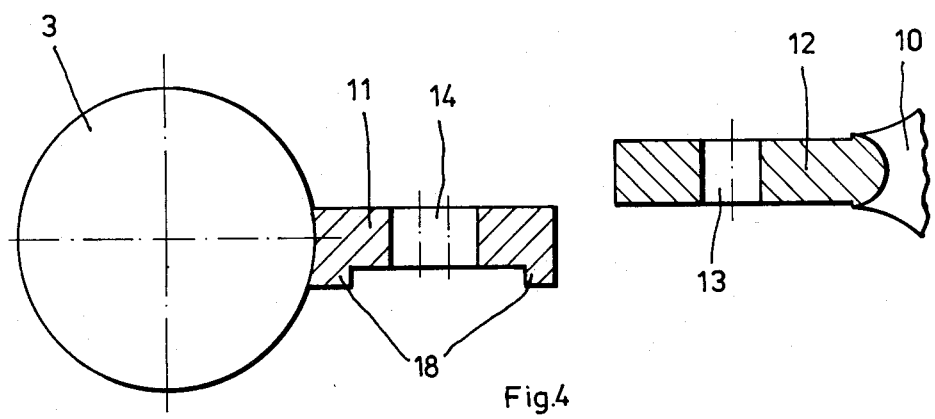
FIG. 4 is a cross sectional showing of a portion of FIG. 3.

FIG. 4 illustrates a cross sectional view taken through the longitudinal bore 14. It is also within the scope of the present invention that the longitudinal bore 14 and the clamping jaws 18 are provided not in the extension 11 of the shock absorber 3, but in the extension 12 of the wheel support 10.

Figure 5:
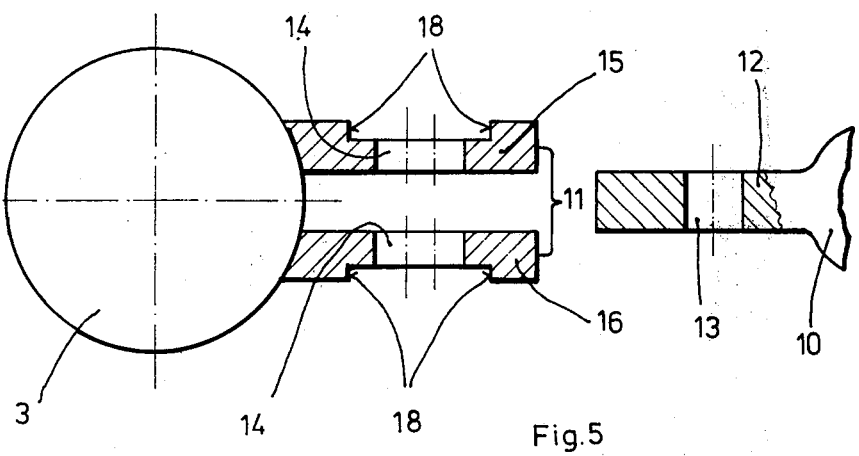
FIG. 5 is a schematic illustration of further embodiment of the setting arrangement according to the present invention.

FIG. 5 illustrates a further embodiment of the camber setting arrangement according to the present invention. The extension which is provided with a longitudinal bore or slot, similarly as in FIG. 1, is formed by a pair of adjacently arranged clamping jaws 15 and 16 running parallel to the shock absorber leg 2. Between the clamping jaws 15 and 16 the extension 12 of the wheel support 10 is shoved for bolting the entire assembly together. Both clamping jaws 15 and 16 are provided for the guiding of the eccenter disc of the eccenter bolt with a pair of guide cheeks 18. It is also within the scope of the present invention in connection with this embodiment that the extension 12 of the wheel support 10 is formed by the adjacently lying clamping jaws 15 and 16 having a longitudinal slot and the guide cheeks 18 provided therein.

The eccenter disc 9 of the eccenter bolt 7 can be welded with the eccenter shaft 8. The disc 9 can be, however, simply pressed on the shaft 8. Similarly the eccenter shaft 8 and the eccenter disc 9 can be made from a single wrought iron piece. In the above illustrated embodiments in which a pair of clamping jaws are provided with guide cheeks and with which consequently a pair of eccenter discs become necessary, it is only possible that one of the eccenter discs 9 is fixedly secured with the eccenter shaft 8. The second eccenter disc which in FIG. 2 would be the upper disc, becomes then positively coupled with the eccenter shaft 8 some other way, for example, by shoving the eccenter disc onto a flat lug of the eccenter shaft or on a lug thereof which has several edges. The camber setting arrangement has been explained and described with respect to a front wheel axle, however, it is desired that the broad concept of the invention should not be limited to such front wheel axle alone.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An arrangement for setting the camber of a wheel of a vehicle supported on the vehicle frame by a link coupling means, wheel support means and guiding upright elongated shock absorber leg means, comprising
    means for fixedly securing said shock absorber leg means at an upper region thereof to the vehicle frame;
    an upper set and a lower set of substantially horizontal registering bores formed in the lower region of said shock absorber leg means and in said wheel support means, respectively;
    bolt means extending through the bores of one of said sets and securing said shock absorber leg means to said wheel support means; and
    camber-setting means, including an eccenter bolt means extending through the bores of the other set and operative, when turned in said bores, for varying the camber setting of said wheel.

2. The arrangement as claimed in claim 1, wherein said shock absorber leg means is provided with an extension having a pair of said bores formed therein and said wheel support means is provided with an extension also having a pair of said bores formed therein, one of said bores of one of said extensions being formed as a longitudinal slot and having a longitudinal axis directed radially with respect to the axis of the shock absorber leg means.

3. The arrangement as claimed in claim 2, wherein said shock absorber leg means comprises a shock absorber portion, a clamp means arranged on said shock absorber portion for fixedly clamping said shock absorber portion and having a shank portion, said shank portion comprising said extension of said shock absorber leg means and having said pair of bores formed therein for securing to the extension of said wheel support means.

4. The arrangement as claimed in claim 3, and wherein said clamp means comprises a pair of clamping jaws extending parallel with respect to each other and parallel with respect to the axis of said shock absorber leg means and adapted to receive said extension of said wheel support therebetween for bolting said shock absorber leg means to said wheel support means.

5. The arrangement as claimed in claim 4, wherein said eccenter bolt means comprises an eccenter shaft and an eccenter disc positively coupled thereto in an eccentric fashion, wherein said eccenter shaft passes through said set of bores and said eccenter disc is guided in a pair of guide cheek means running parallel with respect to the axis of said shock absorber leg means, said guide cheek means being provided on that extension means having said longitudinal slot.

6. The arrangement as claimed in claim 5, wherein each of said clamping jaws is provided with guide cheek means for guiding said eccenter disc therein.

7. The arrangement as claimed in claim 2, wherein said extension of said shock absorber leg means comprises a pair of clamping jaws.

8. The arrangement as claimed in claim 2, wherein said extension of said wheel support means is provided with a pair of clamping jaws.

9. The arrangement as claimed in claim 5, wherein said eccenter disc is fixedly pressed onto said eccenter shaft.

10. The arrangement as claimed in claim 5, wherein said eccenter disc is welded to said eccenter shaft.

11. The arrangement as claimed in claim 5, wherein said eccenter shaft and said eccenter disc are formed integrally with each other.

12. The arrangement as claimed in claim 5, wherein said eccenter shaft comprises a plain lug means, said eccenter disc being positively coupled to said lug means.

13. The arrangement as claimed in claim 5, wherein said eccenter shaft comprises a lug means having a plurality of edges, said eccenter disc being positively coupled to said lug means.

* * * * *

UNITED STATES PATENT OFFICE
CERTIFICATE OF CORRECTION

Patent No. 3,917,308            Dated November 4, 1975

Inventor(s) Waldemar Schulz

It is certified that error appears in the above-identified patent and that said Letters Patent are hereby corrected as shown below:

In the Heading:

1. The Title should read as follows:

--ARRANGEMENT FOR SETTING THE CAMBER OF A PAIR OF VEHICLE WHEELS--.

2. Following the name of the inventor, the next item should read as follows:

--Assignee: Volkswagenwerk Aktiengesellschaft

Signed and Sealed this

Twenty-seventh Day of June 1978

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 3,917,308  Dated November 4, 1975

Inventor(s) Waldemar Schulz

It is certified that error appears in the above-identified patent and that said Letters Patent are hereby corrected as shown below:

In the Heading:

1. The Title should read as follows:

--ARRANGEMENT FOR SETTING THE CAMBER OF A PAIR OF VEHICLE WHEELS--.

2. Following the name of the inventor, the next item should read as follows:

--Assignee: Volkswagenwerk Aktiengesellschaft, Wolfsburg, Germany--.

This Certificate supersedes Certificate of Correction issued June 27, 1978.

Signed and Sealed this

Fourteenth Day of November 1978

[SEAL]

Attest:

RUTH C. MASON
Attesting Officer

DONALD W. BANNER
Commissioner of Patents and Trademarks